Patented Oct. 4, 1932

1,880,677

UNITED STATES PATENT OFFICE

CHRISTOPH BECK AND FRANZ KREMP, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

RECOVERY OF ORGANIC ACIDS

No Drawing. Application filed September 19, 1929, Serial No. 393,831, and in Germany September 28, 1928.

The present invention relates to the recovery of organic acids.

In order that the organic acids obtained by the oxidation of aliphatic hydrocarbons of high molecular weight, such as solid paraffin hydrocarbons, waxes and the like should be utilizable, it is essential in many cases that they should no longer contain unsaponifiable constituents. By the processes hitherto known, however, the separation of the unsaponifiable constituents from the reaction products is frequently incomplete, or it can only be effected by expensive and time-consuming methods of working, since the said products constitute a heterogeneous mixture of fatty acids, hydroxy carboxylic acids, esters, lactones, ketones, aldehydes and some unattached initial material.

We have now found that an almost complete separation of the unsaponifiable constituents from the oxidation products is readily effected when the latter are treated with concentrated acetic acid containing less than 30 per cent of water, for example glacial acetic acid, preferably while heating to any temperature up to the boiling point of the acetic acid, the insoluble matter being then separated off, if necessary after subsequent cooling to a temperature not below about 15° C. The fatty acids may be recovered from the acetic acid solution of the same by the methods already known, for example by distilling off the acetic acid at atmospheric, or preferably at reduced pressure, or by cooling the acetic acid solutions to below about 15° C. and filtering off the acids which separate out, or by combination of both methods.

In contrast to any expectation the concentrated acetic acid extracts the acid constituents solely, so that very pure and easily saponifiable products are obtained.

The following example will further illustrate the nature of this invention, but the invention is not restricted thereto. The parts are by weight.

Example 100 parts of an oxidation product of paraffin wax having a content of 18 per cent of unsaponifiable material are dissolved in 300 parts of glacial acetic acid at a temperature of 60° C. The solution is then cooled to 18° C. and in this manner the unsaponifiable material and any ester, if such be present, separate out. These are then filtered off by suction and the filtrate obtained is subjected to a distillation in vacuo. The yield of fatty acids is practically quantitative.

What we claim is:—

1. The process for the recovery of organic acids from oxidation products of aliphatic hydrocarbons of high molecular weight, which comprises treating such oxidation product with concentrated acetic acid and removing the insoluble unsaponifiable matter.

2. The process for the recovery of organic acids from oxidation products of aliphatic hydrocarbons of high molecular weight, which comprises treating such oxidation product with concentrated acetic acid, while heating, and removing the insoluble unsaponifiable matter.

3. The process for the recovery of organic acids from oxidation products of aliphatic hydrocarbons of high molecular weight, which comprises treating such oxidation product with concentrated acetic acid, while heating, and removing the insoluble unsaponifiable matter after cooling the reaction mixture to a temperature above 15° C.

4. The process for the recovery of organic acids from oxidation products of aliphatic hydrocarbons of high molecular weight, which comprises treating an oxidation product of paraffin wax with glacial acetic acid, while heating, cooling the reaction mixture to a temperature above 15° C. and removing the insoluble unsaponifiable matter.

5. The process for the recovery of organic acids from oxidation products of aliphatic hydrocarbons of high molecular weight, which comprises treating an oxidation product of paraffin wax with glacial acetic acid, while heating, cooling the reaction mixture to a temperature above 15° C., removing the insoluble unsaponifiable matter and further cooling the remaining solution to a temperature below 15° C.

6. The process for the recovery of organic acids from an oxidation product of paraffin wax, which comprises dissolving the said oxidation product in glacial acetic acid while heating to about 60° C., cooling the solution to about 18° C., removing the insoluble unsaponifiable matter which separates out and recovering the organic acids by subjecting the remaining solution to distillation in vacuo.

In testimony whereof we have hereunto set our hands.

CHRISTOPH BECK.
FRANZ KREMP.